United States Patent
Brown et al.

(10) Patent No.: US 10,216,633 B2
(45) Date of Patent: Feb. 26, 2019

(54) HARDWARE BASED COHERENCY BETWEEN A DATA PROCESSING DEVICE AND INTERCONNECT

(71) Applicant: ARM Limited, Cambridge (GB)

(72) Inventors: Dominic William Brown, Ely (GB); Ashley John Crawford, Ashdon (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/141,954

(22) Filed: Apr. 29, 2016

(65) Prior Publication Data

US 2016/0364333 A1    Dec. 15, 2016

(30) Foreign Application Priority Data

Jun. 11, 2015    (GB) ..................................... 1510185

(51) Int. Cl.
    *G06F 12/08*    (2016.01)
    *G06F 12/0815*    (2016.01)
    (Continued)

(52) U.S. Cl.
    CPC ...... *G06F 12/0815* (2013.01); *G06F 12/0804* (2013.01); *G06F 12/084* (2013.01); *G06F 2212/62* (2013.01); *Y02D 10/13* (2018.01)

(58) Field of Classification Search
    CPC ............................ G06F 12/0815; G06F 12/084
    (Continued)

(56) References Cited

U.S. PATENT DOCUMENTS

2003/0200397 A1* 10/2003 McAllister .......... G06F 12/0828
                                                         711/141
2010/0262788 A1    10/2010 Tsien
        (Continued)

FOREIGN PATENT DOCUMENTS

| EP | 0 817 070 | 1/1998 |
|---|---|---|
| WO | WO 2013/101078 | 7/2013 |

OTHER PUBLICATIONS

Volos, Stavros, et al. "CCNoC: Specializing on-chip interconnects for energy efficiency in cache-coherent servers." Networks on Chip (NoCS), 2012 Sixth IEEE/ACM International Symposium on. IEEE, 2012.

*Primary Examiner* — Than Nguyen
(74) *Attorney, Agent, or Firm* — Leveque IP Law, P.C.

(57) ABSTRACT

There is provided a data processing device including an output port to transmit a request value to an interconnect arranged to implement a coherency protocol, to indicate a request to be subjected to the coherency protocol. An input port receives an acknowledgement value from the interconnect in response to the request value and coherency administration circuitry defines behavior rules for the data processing device in accordance with the coherency protocol and in dependence on the request value and the acknowledgement value. Storage circuitry administers data in accordance with the behavior rules. There is also provided an interconnect including an input port to receive a request value, issued by a data processing device having storage circuitry, to indicate a request for the data processing to be subjected to a coherency protocol. An output port transmits an acknowledgement value to the data processing device in response to the request value and coherency administration circuitry defines behavior rules for the interconnect in accordance with the coherency protocol and in dependence on the request value and the acknowledgement value.

21 Claims, 7 Drawing Sheets

(51) Int. Cl.
*G06F 12/0804* (2016.01)
*G06F 12/084* (2016.01)

(58) Field of Classification Search
USPC .......................................................... 711/141
See application file for complete search history.

(56) References Cited

U.S. PATENT DOCUMENTS

| | | |
|---|---|---|
| 2011/0047352 A1 | 2/2011 | Ganfield et al. |
| 2012/0203984 A1* | 8/2012 | Woffinden .......... G06F 12/0808 711/154 |
| 2013/0268735 A1* | 10/2013 | Gibert Codina .... G06F 12/0815 711/141 |
| 2014/0149687 A1* | 5/2014 | Moll ........................ G06F 12/14 711/146 |
| 2015/0261676 A1* | 9/2015 | Busaba ............... G06F 12/0815 711/144 |
| 2015/0370614 A1* | 12/2015 | Busaba .................. G06F 9/528 711/147 |

* cited by examiner

| State Name | SYSCOREQ | SYSCOACK | Description |
|---|---|---|---|
| Coherency Disabled | 0 | 0 | • Master caches must not contain coherent data<br>• Master must not access coherent data<br>• Master not required to respond to unsolicited access requests<br>• Interconnect must not send unsolicited access requests |
| Coherency Connect | 1 | 0 | • Master caches must not contain coherent data<br>• Master must not access coherent data<br>• Master must respond to unsolicited access requests<br>• Interconnect can send unsolicited access requests |
| Coherency Enabled | 1 | 1 | • Master caches can contain coherent data<br>• Master can access coherent data<br>• Master must be able to respond to unsolicited access requests<br>• Interconnect can send unsolicited access requests |
| Coherency Disconnect | 0 | 1 | • Master caches must not contain coherent data<br>• Master must not access coherent data<br>• Master must respond to unsolicited access requests<br>• Interconnect must complete outstanding unsolicited access requests but not generate new unsolicited access requests |

HARDWARE BASED COHERENCY BETWEEN A DATA PROCESSING DEVICE AND INTERCONNECT

TECHNICAL FIELD

The present technique relates to data processing devices and interconnects. In particular, it relates to hardware-based coherency in such systems.

BACKGROUND

A number of master devices may access a shared resource (also known as a slave device) such as memory via an interconnect. If some of the master devices have a local cache then it is possible that, after modifying data retrieved from memory, the modified version of that data can be stored in a local cache rather than being stored back to memory. However, this can cause problems if another master device needs to access the data. In particular if that master device accesses the version of the data stored in memory then the master device will be operating on out-of-date data, leading to a lack of coherency in the master device's view of the memory system. In order to reduce such problems, a coherency protocol may be implemented in order to dictate the behaviour of particular devices in a system such that all master devices have a coherent view of data.

A software controller, somewhere in the system, may take charge of the process of connecting to or disconnecting a master device from the system in such a way that the system remains coherent. Such a software controller may require the use of expensive communication between hardware and software components in order to complete the connection or disconnection process.

SUMMARY

Viewed from a first example configuration, there is provided a data processing device comprising: an output port to transmit a request value to an interconnect arranged to implement a coherency protocol, to indicate a request to be subjected to the coherency protocol; an input port to receive an acknowledgement value from the interconnect in response to the request value; coherency administration circuitry to define behaviour rules for the data processing device in accordance with the coherency protocol and in dependence on the request value and the acknowledgement value; and storage circuitry to administer data in accordance with the behaviour rules.

Viewed from a second example configuration, there is provided an interconnect comprising: an input port to receive a request value, issued by a data processing device, to indicate a request for the data processing device to be subjected to a coherency protocol; an output port to transmit an acknowledgement value to the data processing device in response to the request value; coherency administration circuitry to define behaviour rules for the interconnect in accordance with the coherency protocol and in dependence on the request value and the acknowledgement value.

Viewed from a third example configuration, there is provided a data processing device comprising: an output means for transmitting a request value to an interconnect arranged to implement a coherency protocol, to indicate a request to be subjected to the coherency protocol; an input means for receiving an acknowledgement value from the interconnect in response to the request value; coherency administration means for defining behaviour rules for the data processing device in accordance with the coherency protocol and in dependence on the request value and the acknowledgement value; and storage means for administering data in accordance with the behaviour rules.

Viewed from a fourth example configuration, there is provided an interconnect comprising: an input means for receiving a request value, issued by a data processing device, to indicate a request for the data processing device to be subjected to a coherency protocol; an output means for transmitting an acknowledgement value to the data processing device in response to the request value; coherency administration means for defining behaviour rules for the interconnect in accordance with the coherency protocol and in dependence on the request value and the acknowledgement value.

Viewed from a fifth example configuration, there is provided a method of operating a data processing apparatus, comprising: transmitting a request value to an interconnect arranged to implement a coherency protocol, to indicate a request to be subjected to the coherency protocol; receiving an acknowledgement value from the interconnect in response to the request value; defining behaviour rules for the data processing device in accordance with the coherency protocol and in dependence on the request value and the acknowledgement value; and administering data in accordance with the behaviour rules.

Viewed from a sixth example configuration, there is provided a method of operating an interconnect, comprising: receiving a request value, issued by a data processing device, to indicate a request for the data processing to be subjected to a coherency protocol; transmitting an acknowledgement value to the data processing device in response to the request value; defining behaviour rules for the interconnect in accordance with the coherency protocol and in dependence on the request value and the acknowledgement value.

BRIEF DESCRIPTION OF THE DRAWINGS

The present invention will be described further, by way of example only, with reference to embodiments thereof as illustrated in the accompanying drawings, in which:

FIG. 7 illustrates communications between a power controller and Central Processing Unit (CPU) in a coherent master device in accordance with one embodiment.

DESCRIPTION OF EMBODIMENTS

Before discussing the embodiments with reference to the accompanying figures, the following description of embodiments is provided. Note that in the following description, the term "first value" is used to refer to a value that can be distinguished from a corresponding "second value". The actual values used are not significant. However, an example of the first value is "1" and an example of the second value is "0".

In accordance with one example configuration there is provided a data processing device comprising: an output port to transmit a request value to an interconnect arranged to implement a coherency protocol, to indicate a request to be subjected to the coherency protocol; an input port to receive an acknowledgement value from the interconnect in response to the request value; coherency administration circuitry to define behaviour rules for the data processing device in accordance with the coherency protocol and in dependence on the request value and the acknowledgement value; and storage circuitry to administer data in accordance with the behaviour rules.

In accordance with the above, the data processing device is coupled to an interconnect, which may in turn be coupled with one or more further data processing devices and/or slave devices. The interconnect implements a coherency protocol such that master devices (such as the data processing device) can access data stored on slave devices in such a manner that coherency can be maintained. In other words, if a master device requests data from a slave device, the interconnect will cause the most up-to-date version of that data to be retrieved, even if the most up-to-date version of the data is stored somewhere other than the slave device. The coherency administration circuitry defines behaviour rules for the data processing device in accordance with the coherency protocol and the data processing device implements these behaviour rules.

Connection and disconnection of a data processing device to a coherent system takes place using a "handshake" protocol. It has previously been proposed to use software somewhere in the coherent system in order to manage the handshaking process during connection and disconnection to the coherent system. Such software can run as part of the main operating system of, for example, a master device. Such software can alternatively execute on a separate control processor. However, such software can often require knowledge of the coherent system and typically requires communication to be performed between hardware components and software elements for the handshake to occur. Such communication can be inefficient. In contrast, the data processing device described above implements the handshaking process using hardware between the connected devices, which results in the exchange of a request value and an acknowledgement value between the data processing device and the interconnect. The behaviour rules defined by the coherency administration circuitry and implemented by the data processing device can therefore be implemented independently of software executing on a processing circuit (processor) within the system. For example, the handshake process for connection and for disconnection can be implemented entirely in hardware as opposed to software. In some cases, the behaviour rules can be implemented without reference to software executing on a processing circuit in the system.

By implementing such a handshaking mechanism for connection and disconnection using hardware, it may be possible to implement the connection and disconnection of a data processing device to the coherent system efficiently. Furthermore, since disconnection from a coherent system must take place before a device can be powered down, it may be possible to provide more efficient, faster, and simpler power management control of the data processing device.

In some embodiments, the storage circuitry comprises a cache. The cache stores local copies of data so that the data processing device is able to efficiently access the data value without having to communicate via the interconnect with the shared memory device each time the data value is to be accessed. Of particular relevance to the present techniques is the idea that data modified by a data processing device may be stored in the local cache of that data processing device.

In some embodiments, the coherency administration circuitry comprises cache flush circuitry to control the behaviour of the data processing device in accordance with the coherency protocol by enabling the cache to retain coherent data in dependence on the request value and the acknowledgement value. For example, in some embodiments the cache flush circuitry is responsive to the request value having a first request value and the acknowledgement value having a first acknowledgement value to enable the cache to retain coherent data, and otherwise to prevent the cache from retaining coherent data. Consequently, if the request value does not have the first request value or the acknowledgement value does not have the first acknowledgement value, then coherent data is not stored in the cache. This behaviour continues until the request value has the first request value and the acknowledgement value has the first acknowledgement value. At the instant this occurs, the cache should not contain any dirty, valid cache lines, since such data will not have been stored. However, from that point forward, the cache retains coherent data (e.g. data that is modified by the data processing device). When the request value is due to change once more, a cache flush will occur. A cache flush is a process in which the lines of a cache that are both dirty (have been locally edited) and valid (still in use by the data processing device) are stored back into a slave device such as a shared memory. Accordingly, the shared memory will thereafter contain the most up-to-date version of the data. The request value then changes, meaning that the cache will no longer be permitted to store coherent data.

In some embodiments, the coherency administration circuitry comprises snoop control circuitry to control the behaviour of the data processing device in accordance with the coherency protocol by requiring the cache to respond to an unsolicited access request transmitted by the interconnect in dependence on the request value and the acknowledgement value. Typically when a data processing device wishes to access a data value, it issues an access request to the interconnect and then waits for a response back from the interconnect containing the data value that was requested. However, in some cases an unsolicited access request is issued to a data processing device. There are a number of situations in which this can arise, for example the unsolicited access request may be at least one of a snoop request and a distributed virtual memory access request. Accordingly, the cache may be required to respond to unsolicited access requests such as snoop requests and distributed virtual memory access requests depending on the request value and the acknowledgement value. In some embodiments, in other cases, the interconnect refrains from sending unsolicited requests, thereby enabling the data processing device to enter a low power mode.

In some embodiments, the snoop control circuitry is responsive to the request value having a second request value and the acknowledgement value having a second acknowledgement value to enable the cache to respond to the unsolicited access request transmitted by the interconnect, and otherwise to require the cache to respond to the unsolicited access request transmitted by the interconnect. Hence, if the request value does not have the second request value and the acknowledgement value does not have the second acknowledgement value, then the cache may be required to respond to unsolicited access requests transmitted by the interconnect. In other cases the cache is not required to respond but might still be permitted to respond to such unsolicited access requests.

In some embodiments, the coherency administration circuitry is to control the behaviour of the interconnect in accordance with the coherency protocol by allowing a data access request to data that is to be kept coherent in dependence on the first request value and the first acknowledgement value. Consequently, depending on the first request value and the first acknowledgement value, the coherency administration circuitry may allow or prevent a data access request to data that is to be kept coherent. For example, in some embodiments, the coherency administration circuitry is responsive to the request value having a first request value and the acknowledgement value having a first acknowledgement value to allow the data access request and otherwise to disallow the data access request. The data access request may be disallowed by preventing its generation or by preventing its transmission to the interconnect.

In some embodiments the request value is dependent on component request values; and the acknowledgement value is dependent on component acknowledgement values. For example, the request value and the acknowledgement value may be derived from or based on individual component values. Such component values can even be transmitted independently.

The component request values may comprise a connect request value and a disconnect request value; and the component acknowledgement values may comprise a connect acknowledgement value and a disconnect acknowledgement value. Component values may be mutually exclusive such that the request value is asserted when the connect request value is asserted and the request value is un-asserted when the disconnect request value is asserted. In this manner, a pair of component request values is used to produce the (overall) request value. Similarly, in the case of the acknowledgement value, the acknowledgement value is asserted when the connect acknowledgement value is asserted and is un-asserted when the disconnect acknowledgment value is asserted.

In accordance with a second example configuration there is provided an interconnect comprising: an input port to receive a request value, issued by a data processing device having storage circuitry, to indicate a request for the data processing device to be subjected to a coherency protocol; an output port to transmit an acknowledgement value to the data processing device in response to the request value; coherency administration circuitry to define behaviour rules for the interconnect in accordance with the coherency protocol and in dependence on the request value and the acknowledgement value.

Typically, the data processing device is one of a plurality of data processing devices that are connected or connectable to the interconnect.

Similarly to the above described data processing device, the interconnect implements the "other side" of the handshake using hardware. Accordingly, the connection and disconnection of a data processing device to a coherent system via an interconnect may be performed efficiently. For example, the behaviour rules that are defined for the interconnect and are implemented by the interconnect in accordance with the coherency protocol can be implemented independently of software executing on a processing circuit within the system. The behaviour rules can be implemented without reference to software executing on a processing circuit within the system.

In some embodiments the coherency administration circuitry is to control the behaviour of the interconnect in accordance with the coherency protocol by responding to a data access request from the data processing device to data that is to be kept coherent across the plurality of data processing devices, wherein the behaviour of the interconnect is controlled in dependence on the request value and the acknowledgement value. The data processing device may issue data access requests for data that is to be kept coherent across the plurality of the data processing devices. However, the interconnect may respond to such data access requests in dependence on the request value and the acknowledgement value, such that the interconnect behaves in accordance with the coherency protocol.

For example, in some embodiments coherency administration circuitry is responsive to the request value having a first request value and the acknowledgement value having a first acknowledgement value to allow the data access request and otherwise to refuse the data access request. If the request value does not have the first request value and the acknowledgement value does not have the first acknowledgement value, then the data access request is refused. This can be achieved by simply disregarding the data access request issued by the data processing device. Where the request value has the first request value and the acknowledgement value first acknowledgement value, the data access request is allowed. In such cases, the data access request is responded to in accordance with the coherency protocol. This can involve the issuing of, for example, snoop requests to other data processing devices in the plurality of data processing devices in order to determine whether a more up-to-date version of the requested data exists in the storage circuitry of one of the other data processing devices. If it is determined, either via snoop requests or via internal records at the interconnect, that none of the other data processing devices contains a more up-to-date version of the data, then the request may be forwarded to a slave device such as a shared memory. In either event, the most up-to-date version of the data will be acquired by the interconnect and then forwarded to the requesting data processing device.

In some embodiments the coherency administration circuitry comprises snoop circuitry, responsive to a data access request transmitted by one of the plurality of data processing devices other than the data processing device to control the behaviour of the interconnect in accordance with the coherency protocol by generating and transmitting a snoop request to the data processing device in dependence on the request value and the acknowledgement value. As previously explained, a snoop request can be generated and sent to a data processing device when a data processing device issues a data access request for a piece of data via the interconnect, the interconnect may generate one or more snoop requests to determine whether other data processing devices connected to the interconnect have a more up-to-date version of that data that is stored in the slave device (e.g. a shared memory). In some embodiments however, the snoop circuitry generates and transmits such snoop requests in dependence on the request value and the acknowledgement value. For example, in some embodiments the snoop circuitry is responsive to the request value having a first request value to allow the snoop request to be generated and transmitted to the data processing device and the snoop circuitry is responsive to the request value having a second request value and the acknowledgement value having a second acknowledgement value to suppress the snoop request from being transmitted to the data processing device and otherwise to allow the snoop request to be transmitted to the data processing device on the condition that the snoop request has already been generated. Hence, in the case of the request value having a first request value, a snoop request is permitted to be generated and transmitted to the data processing device. If the request value has the second request value and the acknowledgement value has the second acknowledgement value, then snoop requests are suppressed from being transmitted to the data processing device. This suppression may also extend to the generation of the snoop request itself. Where the request value and the acknowledgement value are other than those discussed, the snoop request is allowed to be transmitted on the condition that it has already been generated. In other words, outstanding snoop requests are completed but new snoop requests are not generated.

As in the case with the data processing device, in some embodiments the request value is dependent on component request values; and the acknowledgement value is dependent on component acknowledgement values. For example, in some embodiments the component request values comprise a connect request value and a disconnect request value; and the component acknowledgement values comprise a connect acknowledgement value and a disconnect acknowledgement value.

A subset of the plurality of the data processing devices may have access to a single cache, independent of the interconnect. This could be the storage circuitry making up each of the data processing devices, or could be additional to the storage circuitry making up each of the data processing devices. The use of the aforementioned hardware handshake and the connection and the disconnection of each of the data processing devices can make it possible to reduce problems that can occur when a number of processing devices share a single cache. Such problems can arise when it becomes unclear as to which of the data processing devices is responsible for the management of the shared cache. In particular, if one of the data processing devices accessing the shared cache were to disconnect from the coherent system, this could result in the shared cache being disconnected or could result in the data processing device responsible for the cache being taken offline thereby causing the shared cache to become unmanaged.

In some embodiments, the input port is further to receive an associated request value from each of a plurality of data processing devices; and the output port is further to transmit an associated acknowledgement value to each of the plurality of data processing devices; and the coherency administration circuitry is to define behaviour rules for the interconnect in respect of each data processing device in the plurality of data processing devices in accordance with the coherency protocol and in dependence on the associated request value and the associated acknowledgement value of that data processing device. The interconnect may therefore support a plurality of data processing devices, each at different stages of connection/or disconnection to the system.

In some embodiments, there is provided a system comprising one of the aforementioned interconnects; and a plurality of data processing devices including one of the aforementioned data processing devices.

Particular embodiments will now be described with reference to the figures.

Figure 1:
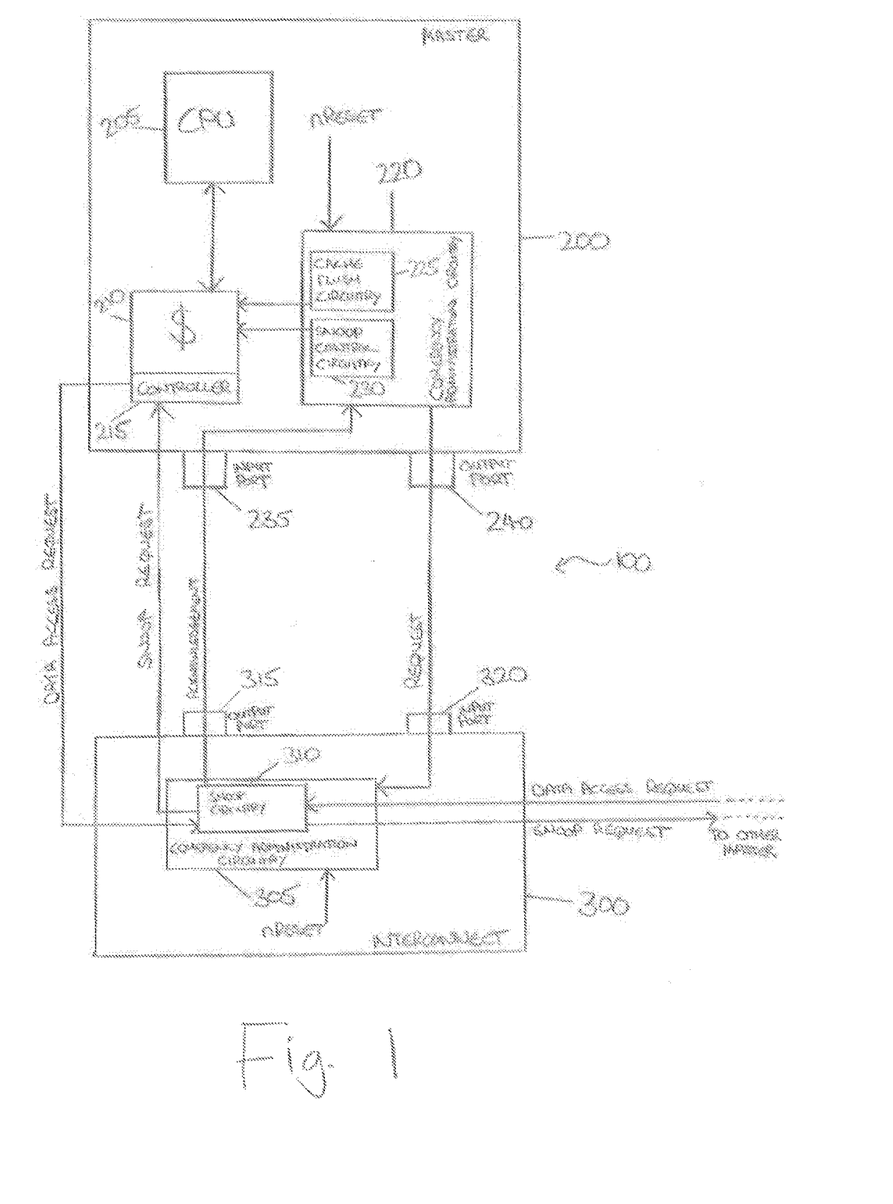
FIG. 1 schematically illustrates a master device in accordance with one embodiment and an interconnect in accordance with one embodiment.

FIG. 1 schematically illustrates a coherent system 100 comprising a master device (which is an example of a data processing device) 200 and an interconnect 300. Other master or slave devices may also be connected to the interconnect 300, however, these are not shown in FIG. 1. The master device 200 comprises a CPU 205 and a cache 210. In this embodiment, a cache 210 is provided as part of the master device 200. However, in other embodiments, the cache may be separate to the master device 200 and may be shared between a plurality of master devices. The cache 210 is controlled by a controller 215, which allows accesses to and from the cache 210 to take place. The cache 210 is an example of storage circuitry. The master device 200 also comprises coherency administration circuitry 220. The coherency administration circuitry 200 comprises cache flush circuitry 225 and snoop control circuitry 230 both of which further control the behaviour of the cache 210. The master device 200 also comprises an input port 235 and an output port 240, by which the master device 200 is coupled to, and in communication with, the interconnect 300. A single port can be provided in lieu of both a separate input port 235 and output port 240. The input port 235 and the output port 240 are used to assert and de-assert request and acknowledgement signals (resulting in the transmission of request and acknowledgement values depending on whether the signal is asserted or un-asserted) to and from the interconnect 300.

The interconnect 300 comprises coherency administration circuitry 305. This is different to the coherency administration circuitry 220 within the master device 200. The coherency administration circuitry 305 within the interconnect 300 controls the behaviour of the interconnect 300 in dealing with the master device 200 in accordance with a coherency protocol. The coherency administration circuitry 305 comprises snoop circuitry 310.

The snoop circuitry 310 is responsible for snooping on data access requests issued by a requesting master device 200 to a slave device via the interconnect 300. In response to these data access requests, the snoop circuitry 310 intercepts the transmittal of the data access request to a slave device and issues one or more snoop requests that are transmitted to some of the master devices other than the requesting master device 200. Master devices then respond to the snoop request with the requested data, if they have it. The interconnect 300 then either forwards the obtained data to the requesting master device 200 or, if none of the master devices return the requested data, the interconnect 300 obtains the data from the slave device and forwards the data to the requesting master device 200. This process is performed so that the requesting master device 200 receives back the latest version of a data value that has been requested rather than simply the version of that data stored in the slave device, which could be out of date.

The interconnect 300 also comprises an output port 315 and an input port 320. These ports are used to couple the interconnect 300 with the master device 200 and thereby assert/de-assert acknowledgement signals between the interconnect 300 and the master device 200. In the embodiment shown in FIG. 1, a separate input port 320 and output port 315 are provided for the transmission of the request signal and acknowledgement signal to a single master device 200. However, in other embodiments, one port is provided for multiple functions and/or for multiple different devices.

Figure 5:
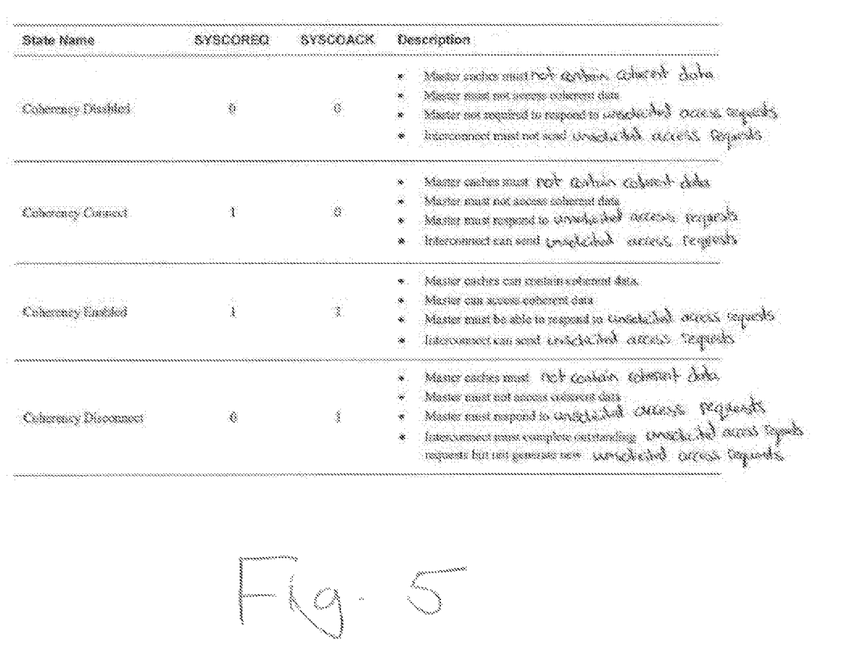
FIG. 5 is a table showing the operational behaviour of the interconnect and master device at each coherency state during the connection and disconnection process in accordance with one embodiment.

The interconnect 300 implements a coherency protocol. The coherency protocol dictates how the interconnect 300 and master device 200 behave in order to ensure that coherency is preserved within the coherent system 100. Coherency administration circuitries 220, 305 define a set of behaviour rules for the master device 200 and interconnect 300 respectively in accordance with the coherency protocol. The behaviour rules are defined in dependence on the acknowledgement signal and request signal exchanged between the master device 200 and the interconnect 300, as shown in FIG. 5, and these behaviour rules are implemented by the master device 200 and interconnect 300. In this way, in dependence on the request signal and the acknowledgement signal, the behaviour of the master device 200 and the interconnect 300 can be controlled such that coherency is maintained within the coherent system 100. In particular, these behaviour rules dictate the behaviour of the cache flush circuitry 225 and the snoop control circuitry 230 in the master device, and also the snoop circuitry 310 within the interconnect 300, as will be discussed later.

Figure 2:
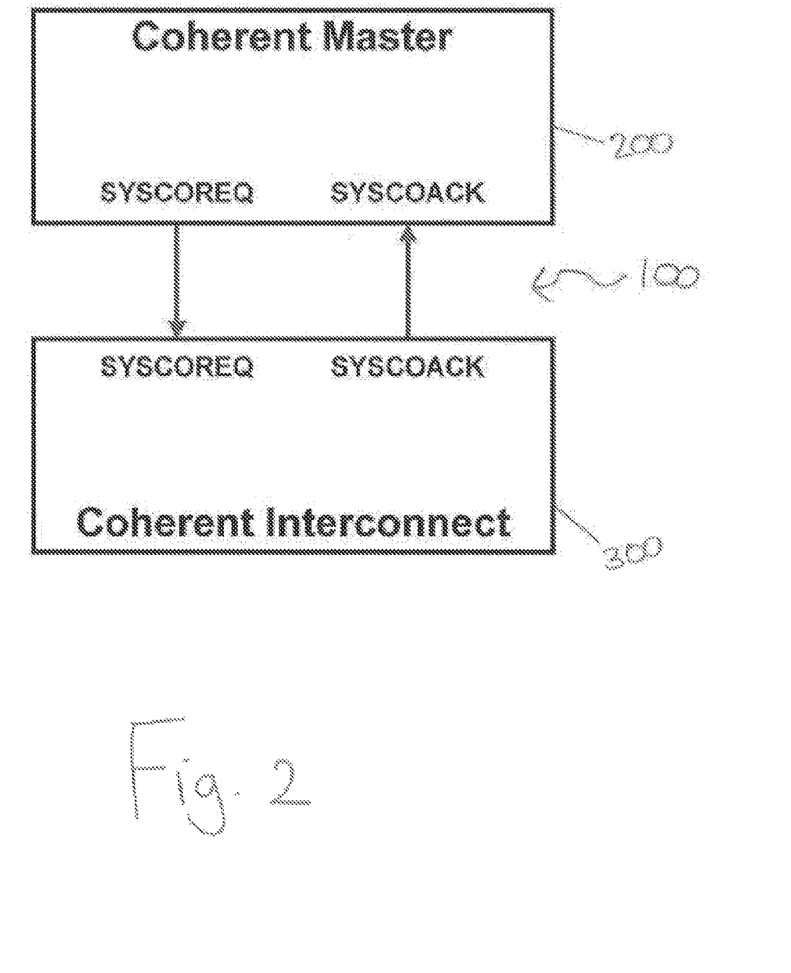
FIG. 2 schematically illustrates the exchange of request and acknowledgement signals between the master and the interconnect in accordance with one embodiment.

FIG. 2 schematically shows the exchange of the signals between a master device 200 and an interconnect 300 that occur during the handshaking process when the master device 200 attempts to connect to or disconnect from the interconnect 300. In particular, the master device 200 transmits a request signal (SYSCOREQ), which is received by the interconnect 300. Additionally, the interconnect 300 transmits an acknowledgement signal (SYSCOACK), which is received by the master device 200.

Figure 3:
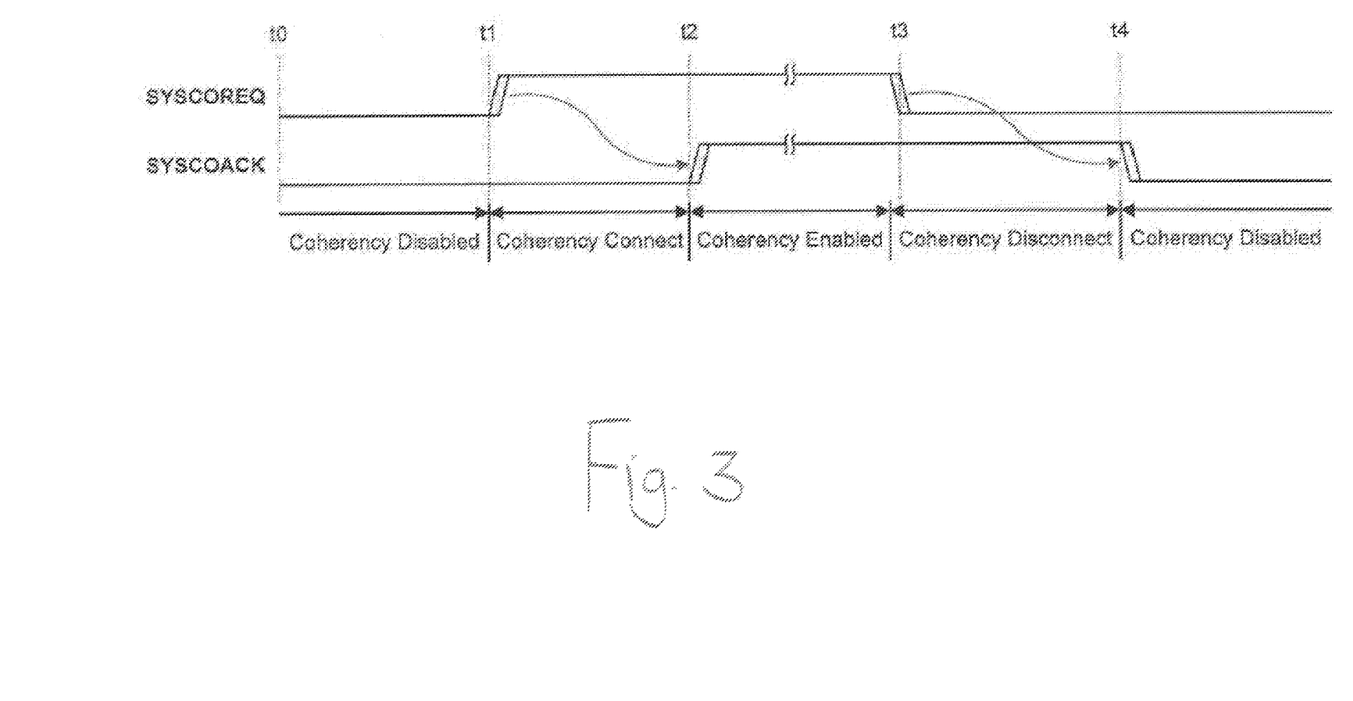
FIG. 3 illustrates a timeline showing how the request and acknowledgement values change during the connection and disconnection of a master and interconnect in accordance with one embodiment.

FIG. 3 is a timeline illustrating how the assertion and the de-assertion of the request signal and acknowledgement signal can cause the master device 200 to connect to or disconnect from the interconnect 300. At a time t0, both SYSCOREQ and SYSCOACK are 0 and the master device 200 is not part of the coherent system 100. At time t1, SYSCOREQ is asserted (in this example the assertion of SYSCOREQ means that SYSCOREQ is '1'). This indicates that the master device 200 wishes to be a part of the coherent system 100 (i.e. that it wishes to join). The signal is received by the interconnect 300 and causes the interconnect 300 to respond by asserting SYSCOACK (e.g. the value of SYSCOACK is set to 1). At this point, the master device 200 is part of the coherent system 100. This continues until time period t3 in which the master device 200 wishes to leave the coherent system 100. This is achieved by the coherent master de-asserting SYSCOREQ (e.g. setting the value to 0). When the interconnect 300 receives the un-asserted signal, it responds by de-asserting SYSCOACK at a time period t4, which in turn is received by the master device 200.

Figure 4:
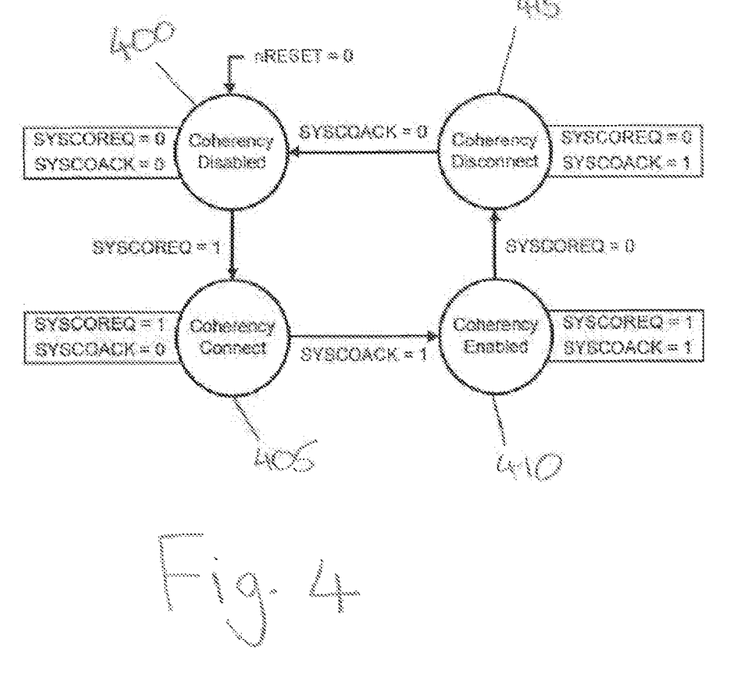
FIG. 4 illustrates a state diagram showing the change in coherency state at a master device as a result of the exchange of the request and acknowledgement values in accordance with one embodiment.

FIG. 4 shows a finite state machine illustrating one example embodiment of a master device 200. In a coherency disabled state 400, the SYSCOREQ and SYSCOACK are un-asserted. The coherency disabled state 400 can be entered at any point as a consequence of the coherency administration circuitry 220, 305 in the interconnect/master device receiving a de-asserted nRESET signal. In the case of the master device, such a signal could originate from, for example, the CPU 205. From the coherency disabled state 400, if SYSCOREQ is asserted, then the master device 200 enters a coherency connection state 405. This represents a state in which the master device 200 is joining the coherent system 100. In this state, if the interconnect 300 responds by asserting SYSCOACK then the master device 200 enters the coherency enabled state 410. This represents the state in which the master device 200 forms part of the coherent system 100 by having connected to the interconnect 300. The master device 200 remains in the coherency enabled state 410 for some period of time, until the master device 200 wishes to leave the coherent system 100. At this point, the master device 200 will de-assert SYSCOREQ. Thus, the master device 200 will enter the coherency disconnect state 415. The interconnect 300 then responds by de-asserting SYSCOACK, at which point the master device 200 re-enters the coherency disabled state 400.

At each of the different states, the behaviour of the master device 200 and the interconnect 300 are affected by different behaviour rules as shown in FIG. 5. The behaviour rules provide that the master device 200 and the interconnect 300 behave in a manner in which the overall coherency of the system can be maintained, particularly during the handshaking process that occurs during the connection and disconnection of the master device 200 to the interconnect 300 when the master device 200 joins or leaves the coherent system 100.

FIG. 5 illustrates a table indicating examples of different behaviour rules of both the master device 200 and the interconnect 300 in accordance with one embodiment. In the coherency disabled state 400, the cache 210 of the master device 200 must not contain coherent data. In other words, the master device 200 is not permitted to store dirty or valid data in its cache 210. Additionally, in the coherency disabled state 400 the master device 200 is not required to respond to unsolicited access requests (such as snoop requests) issued by the interconnect 300. Moreover, the master device 200 is not permitted to access data held within the coherent system 100 that is coherent. This is enforced by the coherency administration circuitry 220 in the master device 200, which prevents the generation of any data access request to data that is to be kept coherent across the coherent system 100 while the master device 200 is in the coherency disabled state 400. In other embodiments, this may be enforced at the interconnect 300 by, for example, the coherency administration circuitry 305 disregarding, discarding, or ignoring data access requests issued by the master device 200 that are directed towards data that is to be kept coherent across the coherent system 100 while the master device 200 is in the coherency disabled state 400. Also in this state, the interconnect 300 must not send unsolicited access requests to the master device 200. This is controlled, for example, by snoop circuitry 310 in the interconnect 300. Accordingly, if another master device issues a data access request, then a snoop request will not be generated or transmitted to the master device 200 in the coherency disabled state 400. This does not affect the coherent system, because the master device in the coherency disabled state is not permitted to store coherent data.

In the coherency connect state 405, any caches 210 belonging to the master device 200 must not contain any coherent data (either as a result of no coherent access request having been made since the master device 200 was last reset or as a result of the flushing process having been performed before previously leaving the coherency enabled state 410 as described below). Additionally, the master device 200 must not access coherent data as previously described. However, in this state, the interconnect 300 is permitted to send unsolicited access requests to the master device 200 and the master device 200 must respond to unsolicited access requests. This behaviour is controlled, for example, by snoop control circuitry 230 in the coherency communication circuitry 220 of the master device 200 and also the snoop circuitry 310 in the coherency administration circuitry 305 of the interconnect 300.

In the coherency enabled state 410, the master device 200 is connected to, and a part of, the coherent system 100. Accordingly, the caches 210 of the master device 200 are permitted to contain coherent data. The master device 200 is also permitted to access coherent data. In other words, in response to a data access request issued by the master device 200, the coherency administration circuitry 205 in the interconnect 300 allows the return of the data that is to be kept coherent. This can be achieved by the issuing of unsolicited access requests (such as snoop requests) by the snoop circuitry 310 in the coherency administration circuitry 305 of the interconnect 300 that are directed towards other master devices in order to obtain the most up-to-date version of the data requested by the master device 200. In addition, the master device 200 must respond to unsolicited access requests issued by the interconnect 300. In other words, the snoop control circuitry 230 enables the master device to respond to snoop requests via the cache controller 215. Additionally, the interconnect 300 is permitted to issue snoop requests directed towards the master device 200 in the coherency enabled state 410. The snoop circuitry 310 is therefore controlled in order to allow the generation of such snoop requests. As already explained, in this state, the caches 210 of the master device 200 are permitted to store coherent data. However, in other states, the caches 210 are not permitted to store coherent data. Accordingly, before leaving the coherency enabled state 410, it is necessary for the cache 210 to write out any dirty, valid data to memory, in a process known as flushing, prior to the coherency disconnect state being entered. This process is controlled by cache flush circuitry 225 in the coherency administration circuitry 220.

In the coherency disconnect state 415, the caches 210 of the master device 200 must have been flushed prior to entering this state. The master device 200 must continue to respond to unsolicited access requests issued by the interconnect 300. The snoop control circuitry 230 therefore configures the cache controller 215 to respond to such requests. In addition, the master device 200 must not access data that is to be kept coherent in the coherent system 100. This is controlled at the coherency administration circuitry 220 in the master device 200, which disallows data access requests being issued to the interconnect 300 that are directed towards data that is to be kept coherent. As previously explained, in other embodiments, this may be enforced by coherency administration circuitry 305 in the interconnect 300 itself. The interconnect 300 must complete any outstanding unsolicited access requests but must not generate any unsolicited access requests that are to be directed towards the master device 200. This is controlled by the snoop circuitry 310 that makes up the coherency administration circuitry 305 into the interconnect 300.

Although the above behaviour rules have referred to snoop requests, the same behaviour is required in relation to any unsolicited access requests transmitted by the interconnect 300. For example, such requests include distributed virtual memory access requests that are issued by the interconnect 300 to a master device 200.

Up until this point, the use of two different signals (SYSCOREQ and SYSCOACK) has been described. However, each of these can instead be formed from a plurality of component signals. For example, SYSCOREQ can be made up from a component request signal and a component disconnection request signal such that SYSCOREQ is un-asserted when the disconnection request signal is asserted, and asserted when the connection request signal is asserted. In such an example, it would likely be the case that the component signals were mutually exclusive such that no two component signals could be asserted simultaneously. Similarly, the signal or value SYSCOACK can also be made up from a connection acknowledgement signal and a disconnection acknowledgement signal such that SYSCOACK is un-asserted when the disconnection acknowledgement signal is asserted, and asserted when the connection acknowledgement signal is asserted. Other ways of representing the different signals will also be apparent to the skilled person. For example, a single signal can be provided in order to represent all four states using a single value for each.

Figure 6:
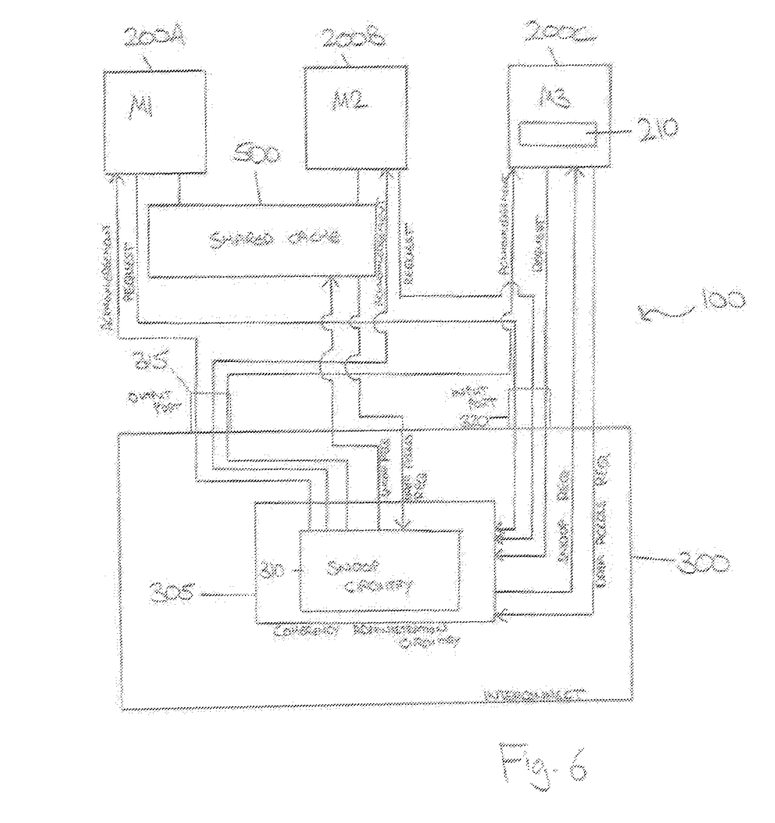
FIG. 6 schematically illustrates a group of master devices using a shared cache in accordance with one embodiment.

FIG. 6 illustrates an embodiment in which the coherent system 100 comprises an interconnect 300 and a plurality of master devices 200*a*, 200*b*, 200*c*. The master devices 200*a*, 200*b*, 200*c* are the same as the master device 200 shown in FIG. 1 except that a subset of the master devices 200*a*, 200*b* comprise a shared cache 500 in place of the internal cache 210 that forms part of the other master device 200*c*. In this embodiment, the shared cache may continue to be used to store coherent data until both master devices 200*a*, 200*b* are disconnected from the coherent system. In other embodiments, the master devices may have a hierarchical relationship.

The use of the previously described handshaking mechanism for the connection and the disconnection of a master device 200 to the coherent system 100 make it possible to efficiently handle connection and disconnection even in the presence of a shared cache 500.

FIG. 7 illustrates, schematically, an example of a master device 200 in accordance with one embodiment. In this embodiment, a power controller 245 communicates with the CPU 205 in order to manage the powering down of the CPU 205, for example in order to reduce the energy consumption of the master device 200, when the CPU 205 indicates to the power controller that it is idle. At that point, the power controller 245 indicates to the CPU 205 that it is intending to power down the CPU 245. The CPU 205 is then able to instigate the coherent disconnect of the master device 200 from the coherent system 100. Once this is completed, the CPU 205 notifies the power controller 245 that preparations for the power down have been completed. The power controller 245 is able to power off the CPU 205.

In this way, there is no need for either the CPU 205 or the power controller 245 to be aware of the exact configuration of the other. Instead, it is only necessary for a simple interface to be provided at each, such that the exchange of queries and responses can take place.

As can be seen, the aforementioned embodiments make it possible to implement a mechanism for connecting and disconnecting a master device 200 to and from a coherent system 100 by the use of hardware. The mechanism is such that coherency can be preserved and the connection and disconnection can be carried out efficiently without reference to software and independently of any software that executes on a processing circuitry anywhere in the coherent system 100. In the described embodiments, the connection and disconnection occurs entirely in hardware. As a result, no software communication is required and so the connection and disconnection processes can be carried out appropriately and efficiently. Additionally, the hardware can take care of the addition and removal of itself from the system coherency and therefore a simple process can be used in order to negotiate the powering down of the CPU 205 in a coherent system 100. The solution is scalable. For example, the specific solution does not require knowledge of the entire coherent system 100 in order for the handshaking mechanism to be implemented.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other data processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing device comprising:
   an output port to transmit a request value to an interconnect arranged to implement a coherency protocol, to indicate a request to be subjected to the coherency protocol;
   an input port to receive an acknowledgement value from the interconnect in response to the request value;
   coherency administration circuitry to define behaviour rules for the data processing device in accordance with the coherency protocol and in dependence on the request value and the acknowledgement value; and
   storage circuitry to administer data in accordance with the behaviour rules.

2. A data processing device according to claim 1, wherein the storage circuitry comprises a cache.

3. A data processing device according to claim 2, wherein the coherency administration circuitry comprises cache flush circuitry to control the behaviour of the data processing device in accordance with the coherency protocol by enabling the cache to retain coherent data in dependence on the request value and the acknowledgement value.

4. A data processing device according to claim 3, wherein the cache flush circuitry is responsive to the request value having a first request value and the acknowledgement value having a first acknowledgement value to enable the cache to retain coherent data, and otherwise to prevent the cache from retaining coherent data.

5. A data processing device according to claim 2, wherein the coherency administration circuitry comprises snoop control circuitry to control the behaviour of the data processing device in accordance with the coherency protocol by requiring the cache to respond to an unsolicited access request transmitted by the interconnect in dependence on the request value and the acknowledgement value.

6. A data processing device according to claim 5, wherein the unsolicited access request is at least one of: a snoop request and a distributed virtual memory access request.

7. A data processing device according to claim 5, wherein the snoop control circuitry is responsive to the request value having a second request value and the acknowledgement value having a second acknowledgement value to enable the cache to respond to the unsolicited access request transmitted by the interconnect, and otherwise to require the cache to respond to the unsolicited access request transmitted by the interconnect.

8. A data processing device according to claim 1, wherein the coherency administration circuitry is to control the behaviour of the interconnect in accordance with the coherency protocol by allowing a data access request to data that is to be kept coherent in dependence on the first request value and the first acknowledgement value.

9. A data processing device according to claim 8, wherein the coherency administration circuitry is responsive to the request value having a first request value and the acknowledgement value having a first acknowledgement value to allow the data access request and otherwise to disallow the data access request.

10. A data processing device according to claim 1, wherein
    the request value is dependent on component request values; and
    the acknowledgement value is dependent on component acknowledgement values.

11. A data processing device according to claim 10, wherein
    the component request values comprise a connect request value and a disconnect request value; and
    the component acknowledgement values comprise a connect acknowledgement value and a disconnect acknowledgement value.

12. An interconnect comprising:
    an input port to receive a request value, issued by a data processing device, to indicate a request for the data processing device to be subjected to a coherency protocol;
    an output port to transmit an acknowledgement value to the data processing device in response to the request value; and
    coherency administration circuitry to define behaviour rules for the interconnect in accordance with the coherency protocol and in dependence on the request value and the acknowledgement value.

13. An interconnect according to claim 12, wherein the coherency administration circuitry is to control the behaviour of the interconnect in accordance with the coherency protocol by responding to a data access request from the data processing device to data that is to be kept coherent across a plurality of data processing devices,
    wherein the behaviour of the interconnect is controlled in dependence on the request value and the acknowledgement value.

14. An interconnect according to claim 13, wherein the coherency administration circuitry is responsive to the request value having a first request value and the acknowledgement value having a first acknowledgement value to allow the data access request and otherwise to refuse the data access request.

15. An interconnect according to claim 12, wherein the coherency administration circuitry comprises snoop circuitry, responsive to a data access request transmitted by one of the plurality of data processing devices other than the data processing device, to control the behaviour of the interconnect in accordance with the coherency protocol by generating and transmitting a snoop request to the data processing device in dependence on the request value and the acknowledgement value.

16. An interconnect according to claim 15, wherein
the snoop circuitry is responsive to the request value having a first request value to allow the snoop request to be generated and transmitted to the data processing device; and
and the snoop circuitry is responsive to the request value having a second request value and the acknowledgement value having a second acknowledgement value to suppress the snoop request from being transmitted to the data processing device, and otherwise to allow the snoop request to be transmitted to the data processing device on the condition that the snoop request has already been generated.

17. An interconnect according to claim 12, wherein
a subset of the plurality of data processing devices have access to a shared cache, independent of the interconnect.

18. An interconnect according to claim 12, wherein
the input port is further to receive an associated request value from each of a plurality of data processing devices; and
the output port is further to transmit an associated acknowledgement value to each of the plurality of data processing devices; and
the coherency administration circuitry is to define behaviour rules for the interconnect in respect of each data processing device in the plurality of data processing devices in accordance with the coherency protocol and in dependence on the associated request value and the associated acknowledgement value of that data processing device.

19. A system comprising:
an interconnect; and
a plurality of data processing devices,
the interconnect comprising:
an input port of the interconnect to receive a request value, issued by a data processing device of the plurality of data processing devices, to indicate a request for the data processing device of the plurality of data processing devices to be subjected to a coherency protocol;
an output port of the interconnect to transmit an acknowledgement value to the data processing device of the plurality of data processing devices in response to the request value; and
coherency administration circuitry of the interconnect to define behaviour rules for the interconnect in accordance with the coherency protocol and in dependence on the request value and the acknowledgement value;
the data processing device of the plurality of data processing devices comprising:
an output port of the data processing device of the plurality of data processing devices to transmit the request value to the interconnect arranged to implement the coherency protocol, to indicate a request to be subjected to the coherency protocol;
an input port of the data processing device of the plurality of data processing devices to receive an acknowledgement value from the interconnect in response to the request value;
coherency administration circuitry of the data processing device of the plurality of data processing devices to define behaviour rules for the data processing device of the plurality of data processing devices in accordance with the coherency protocol and in dependence on the request value and the acknowledgement value; and
storage circuitry to administer data in accordance with the behaviour rules.

20. A method of operating a data processing apparatus, comprising:
transmitting a request value to an interconnect arranged to implement a coherency protocol, to indicate a request to be subjected to the coherency protocol;
receiving an acknowledgement value from the interconnect in response to the request value;
defining behaviour rules for the data processing device in accordance with the coherency protocol and in dependence on the request value and the acknowledgement value; and
administering data in accordance with the behaviour rules.

21. A method of operating an interconnect, comprising:
receiving a request value, issued by a data processing device, to indicate a request for the data processing to be subjected to a coherency protocol;
transmitting an acknowledgement value to the data processing device in response to the request value;
defining behaviour rules for the interconnect in accordance with the coherency protocol and in dependence on the request value and the acknowledgement value.

* * * * *